United States Patent
Park et al.

(10) Patent No.: US 10,886,543 B2
(45) Date of Patent: Jan. 5, 2021

(54) REDOX FLOW BATTERY USING ELECTROLYTE CONCENTRATION GRADIENT AND OPERATION METHOD THEREOF

(71) Applicant: DOOSAN HEAVY INDUSTRIES & CONSTRUCTION CO., LTD., Changwon-si (KR)

(72) Inventors: Sung Ku Park, Yongin-si (KR); Ju Young Youn, Yongin-si (KR); Young Hoon Rhie, Yongin-si (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 68 days.

(21) Appl. No.: 16/352,798

(22) Filed: Mar. 13, 2019

(65) Prior Publication Data

US 2019/0296373 A1  Sep. 26, 2019

(30) Foreign Application Priority Data

Mar. 20, 2018 (KR) .................. 10-2018-0031882
Dec. 11, 2018 (KR) .................. 10-2018-0158791

(51) Int. Cl.
*H01M 8/18* (2006.01)
*H01M 8/0289* (2016.01)

(52) U.S. Cl.
CPC ......... *H01M 8/0289* (2013.01); *H01M 8/188* (2013.01)

(58) Field of Classification Search
None
See application file for complete search history.

(56) References Cited

U.S. PATENT DOCUMENTS 4,956,244 A * 9/1990 Shimizu .............. H01M 8/0693
                                              429/409
9,227,781 B1 * 1/2016 Daniel .................... H01M 8/20
(Continued)

FOREIGN PATENT DOCUMENTS

CN  102148388 A  8/2011
JP  04-004569 A  1/1992
(Continued)

OTHER PUBLICATIONS

A Korean Office Action dated Feb. 26, 2019 in connection with Korean Patent Application No. 10-2018-0031882 which corresponds to the above-referenced U.S. application.
(Continued)

*Primary Examiner* — Scott J. Chmielecki
(74) *Attorney, Agent, or Firm* — Invenstone Patent, LLC

(57) ABSTRACT

The present disclosure relates to a redox flow battery using an electrolyte concentration gradient, capable of increasing the efficiency of the redox flow battery, and to an operation method thereof. The redox flow battery includes a catholyte tank having an electrolyte inlet at the top thereof and an electrolyte outlet at the bottom thereof and having a partition plate for forming a concentration gradient of a catholyte received therein, an anolyte tank having an electrolyte inlet at the top thereof and an electrolyte outlet at the bottom thereof and having a partition plate for forming a concentration gradient of an anolyte received therein, and a stack for charging and discharging power by receiving the catholyte and the anolyte supplied from the catholyte tank and the anolyte tank.

20 Claims, 15 Drawing Sheets

(56) References Cited

U.S. PATENT DOCUMENTS

| | | | | |
|---|---|---|---|---|
| 2006/0144700 A1* | 7/2006 | Carson | .................. | C02F 1/4672 |
| | | | | 204/252 |
| 2012/0282501 A1* | 11/2012 | Haynes | ............... | H01M 12/085 |
| | | | | 429/70 |
| 2014/0255734 A1* | 9/2014 | Tennessen | ............... | H01M 8/20 |
| | | | | 429/51 |
| 2018/0342753 A1* | 11/2018 | Nakajima | ......... | H01M 8/04201 |

FOREIGN PATENT DOCUMENTS

| | | | |
|---|---|---|---|
| JP | 04004569 A | * | 1/1992 |
| JP | 2001-216995 A | | 8/2001 |
| KR | 10-2015-0138773 A | | 12/2015 |
| KR | 20170037388 A | | 4/2017 |
| KR | 10-2017-0077720 A | | 7/2017 |
| KR | 101752890 B1 | | 7/2017 |
| KR | 101760983 B1 | | 7/2017 |

OTHER PUBLICATIONS

A Korean Notice of Allowance dated Aug. 26, 2019 in connection with Korean Patent Application No. 10-2018-0031882 which corresponds to the above-referenced U.S. application.

* cited by examiner

REDOX FLOW BATTERY USING ELECTROLYTE CONCENTRATION GRADIENT AND OPERATION METHOD THEREOF

CROSS REFERENCE TO RELATED APPLICATION

The present application claims priority to Korean Patent Application No. 10-2018-0031882, filed Mar. 20, 2018 and Korean Patent Application No. 10-2018-0158791, filed Dec. 11, 2018, the entire content of which is incorporated herein for all purposes by these references.

BACKGROUND OF THE DISCLOSURE

1. Field of the Disclosure

The present disclosure relates to a redox flow battery (RFB) using an electrolyte concentration gradient and an operation method thereof, and more particularly to a redox flow battery using an electrolyte concentration gradient, capable of increasing the efficiency of the redox flow battery, and an operation method thereof.

2. Description of the Background Art

Power storage technology is an important technique for efficient overall use of energy, such as efficient use of power, improvement in capability or reliability of a power supply system, expansion of new sources of renewable energy that fluctuate widely over time, and energy recovery from a vehicle, and there is growing demand for the development and social contribution thereof.

In order to balance the supply and demand in semi-autonomous regional power systems such as a micro grid, to appropriately distribute the inconsistent output of new sources of renewable energy, such as wind power and solar power, and to control the influence of voltage and frequency fluctuations caused by differences from existing power systems, thorough research into secondary batteries is ongoing, and the use of secondary batteries in these fields is expected to increase.

In particular, a secondary battery to be used for large-capacity power storage has to possess high energy storage density, and thus a redox flow battery (RFB), which is a secondary battery of high capacity and high efficiency, has recently received much attention.

The redox flow battery converts input electric energy into chemical energy through a charging process to store the chemical energy, and converts the stored chemical energy into electric energy through a discharging process to output the electric energy, like a general secondary battery. However, such a redox flow battery is different from a general secondary battery in that a tank for storing an electrode active material is required because the electrode active material, which has energy stored therein, is present in a liquid state rather than a solid state.

SUMMARY OF THE DISCLOSURE

A typical redox flow battery includes respective tanks connected to a cathode and an anode and configured to store individual electrolytes. The electrolyte stored in each tank is released from the tank to a stack to undergo a reaction (charge or discharge reaction) in the stack, and is recycled back to the tank after the reaction, whereby a concentration gradient of the electrolyte is formed in the tank. The concentration gradient thus formed is quickly dissipated by natural diffusion, convection or artificial agitation.

However, when the concentration gradient of the electrolyte naturally generated is used without dissipation, it is considered that an effect of improving overall battery efficiency may be obtained, thus culminating in the present disclosure.

Accordingly, the present disclosure has been made keeping in mind the problems encountered in the related art, and an objective of the present disclosure is to provide a redox flow battery that is capable of improving overall battery efficiency using a naturally formed electrolyte concentration gradient, and an operation method thereof.

The above and other objectives and advantages of the present disclosure will become apparent from the following description of preferred embodiments.

In order to accomplish the above objective, the present disclosure provides a redox flow battery, comprising: a catholyte tank having an electrolyte inlet at the top thereof and an electrolyte outlet at the bottom thereof and having a partition plate for forming a concentration gradient of a catholyte received therein; an anolyte tank having an electrolyte inlet at the top thereof and an electrolyte outlet at the bottom thereof and having a partition plate for forming a concentration gradient of an anolyte received therein; and a stack for charging and discharging power by receiving the catholyte and the anolyte supplied from the catholyte tank and the anolyte tank.

Here, the partition plate of the catholyte tank may be provided in a horizontal direction, and a plurality of partition plates may be provided. As such, the plurality of partition plates is provided in a horizontal direction, and adjacent partition plates are preferably joined to opposite sides of the catholyte tank.

Also, the partition plate of the anolyte tank may be provided in a horizontal direction, and a plurality of partition plates may be provided. As such, the plurality of partition plates is provided in a horizontal direction, and adjacent partition plates are preferably joined to opposite sides of the anolyte tank.

Also, the stack may include at least one battery cell, the battery cell comprising an ion exchange membrane, and a cathode and an anode with the ion exchange membrane positioned therebetween.

Furthermore, a pump for transferring the catholyte received in the catholyte tank to the stack may be included, and a pump for transferring the anolyte received in the anolyte tank to the stack may be included.

In addition, the present disclosure provides a redox flow battery, comprising: a first catholyte tank having an electrolyte inlet at the top thereof and an electrolyte outlet at the bottom thereof and having a partition plate for forming a concentration gradient of a catholyte received therein; a second catholyte tank having an electrolyte inlet at the top thereof and an electrolyte outlet at the bottom thereof and having a partition plate for forming a concentration gradient of a catholyte received therein; a first anolyte tank having an electrolyte inlet at the top thereof and an electrolyte outlet at the bottom thereof and having a partition plate for forming a concentration gradient of an anolyte received therein; a second anolyte tank having an electrolyte inlet at the top thereof and an electrolyte outlet at the bottom thereof and having a partition plate for forming a concentration gradient of an anolyte received therein; and a stack for charging and discharging power by receiving the catholyte and the anolyte supplied from the first and second catholyte tanks and the first and second anolyte tanks.

Here, the partition plate of each of the first and second catholyte tanks may be provided in a horizontal direction, and a plurality of partition plates may be provided. As such, the plurality of partition plates is provided in a horizontal direction, and adjacent partition plates are preferably joined to opposite sides of each of the first and second catholyte tanks.

Also, the first catholyte tank and the second catholyte tank may be connected to each other via a connection pipe through which the catholyte received therein moves, and the connection pipe is preferably located at a position higher than the partition plates provided in the first catholyte tank and the second catholyte tank.

Also, the first catholyte tank and the second catholyte tank respectively may have extension pipes connected to the electrolyte inlets so that the catholyte introduced into each tank flows to the bottom of the tank.

Furthermore, the partition plate of each of the first and second anolyte tanks may be provided in a horizontal direction, and a plurality of partition plates may be provided. As such, the plurality of partition plates is provided in a horizontal direction, and adjacent partition plates are preferably joined to opposite sides of each of the first and second anolyte tanks.

Also, the first anolyte tank and the second anolyte tank may be connected to each other via a connection pipe through which the anolyte received therein moves, and the connection pipe is preferably located at a position higher than the partition plates provided in the first anolyte tank and the second anolyte tank.

Also, the first anolyte tank and the second anolyte tank respectively may have extension pipes connected to the electrolyte inlets so that the anolyte introduced into each tank flows to the bottom of the tank.

Moreover, the stack may include at least one battery cell, the battery cell comprising an ion exchange membrane, and a cathode and an anode with the ion exchange membrane positioned therebetween.

Furthermore, a pump for transferring the catholyte received in each of the first and second catholyte tanks to the stack may be included, and a pump for transferring the anolyte received in each of the first and second anolyte tanks to the stack may be included.

Also, a controller, configured to control valves provided to electrolyte flow passages respectively connected to the first and second catholyte tanks and the first and second anolyte tanks so as to adjust the opening and closing of the flow passages, may be included.

In addition, the present disclosure provides a redox flow battery, comprising: a catholyte tank having an electrolyte inlet at the top thereof and an electrolyte outlet at the bottom thereof and having a barrier rib provided in a vertical direction to form a concentration gradient of a catholyte received therein; an anolyte tank having an electrolyte inlet at the top thereof and an electrolyte outlet at the bottom thereof and having a barrier rib provided in a vertical direction to form a concentration gradient of an anolyte received therein; and a stack for charging and discharging power by receiving the catholyte and the anolyte supplied from the catholyte tank and the anolyte tank.

Here, a plurality of barrier ribs may be provided in the catholyte tank, and adjacent barrier ribs are preferably joined to opposite sides of the catholyte tank.

Also, a plurality of barrier ribs may be provided in the anolyte tank, and adjacent barrier ribs are preferably joined to opposite sides of the anolyte tank.

Also, the stack may include at least one battery cell, the battery cell comprising an ion exchange membrane, and a cathode and an anode with the ion exchange membrane positioned therebetween.

Furthermore, a pump for transferring the catholyte received in the catholyte tank to the stack and/or a pump for transferring the anolyte received in the anolyte tank to the stack may be included.

In addition, the present disclosure provides a redox flow battery, comprising: a first catholyte tank having an electrolyte inlet at the top thereof and an electrolyte outlet at the bottom thereof and having a barrier rib provided in a vertical direction to form a concentration gradient of a catholyte received therein; a second catholyte tank having an electrolyte inlet at the top thereof and an electrolyte outlet at the bottom thereof and having a barrier rib provided in a vertical direction to form a concentration gradient of a catholyte received therein; a first anolyte tank having an electrolyte inlet at the top thereof and an electrolyte outlet at the bottom thereof and having a barrier rib provided in a vertical direction to form a concentration gradient of an anolyte received therein; a second anolyte tank having an electrolyte inlet at the top thereof and an electrolyte outlet at the bottom thereof and having a barrier rib provided in a vertical direction to form a concentration gradient of an anolyte received therein; and a stack for charging and discharging power by receiving the catholyte and the anolyte supplied from the first and second catholyte tanks and the first and second anolyte tanks.

Here, a plurality of barrier ribs may be provided in each of the first and second catholyte tanks, and adjacent barrier ribs are preferably joined to opposite sides of each of the first and second catholyte tanks.

Also, the first catholyte tank and the second catholyte tank may be connected to each other via a connection pipe through which the catholyte received therein moves, and respectively may have extension pipes connected to the electrolyte inlets so that the catholyte introduced into each tank flows to the bottom of the tank.

Also, a plurality of barrier ribs may be provided in each of the first and second anolyte tanks, and adjacent barrier ribs are preferably joined to opposite sides of each of the first and second anolyte tanks.

Also, the first anolyte tank and the second anolyte tank may be connected to each other via a connection pipe through which the anolyte received therein moves, and respectively may have extension pipes connected to the electrolyte inlets so that the anolyte introduced into each tank flows to the bottom of the tank.

Also, the stack may include at least one battery cell, the battery cell comprising an ion exchange membrane, and a cathode and an anode with the ion exchange membrane positioned therebetween.

Furthermore, a pump for transferring the catholyte received in each of the first and second catholyte tanks to the stack and/or a pump for transferring the anolyte received in each of the first and second anolyte tanks to the stack may be included.

Also, a controller, configured to control valves provided to electrolyte flow passages respectively connected to the first and second catholyte tanks and the first and second anolyte tanks so as to adjust the opening and closing of the flow passages, may be included.

According to the present disclosure, the travel path of an electrolyte can be elongated through a partition plate provided in a tank to thus form an electrolyte concentration gradient in the tank, and an electrolyte having a higher reactant concentration is transferred to a stack, thereby lowering overpotential in the stack.

In particular, circulation of the electrolyte can be blocked through a barrier rib provided in a vertical direction even when the redox flow battery is not in use, thus maintaining the electrolyte concentration gradient, and moreover, when the flow rate of the electrolyte increases during the operation of the redox flow battery, the electrolyte can flow over the barrier rib, making it possible to prevent the pressure drop caused by an increase in the flow velocity in the narrow flow passage.

Thereby, charging or discharging can be achieved with larger current and voltage efficiency can be increased, ultimately increasing overall battery efficiency.

However, the effects of the present disclosure are not limited to the foregoing, and other effects not mentioned herein will be able to be clearly understood by those skilled in the art from the following description.

DETAILED DESCRIPTION OF THE DISCLOSURE

Figure 1:
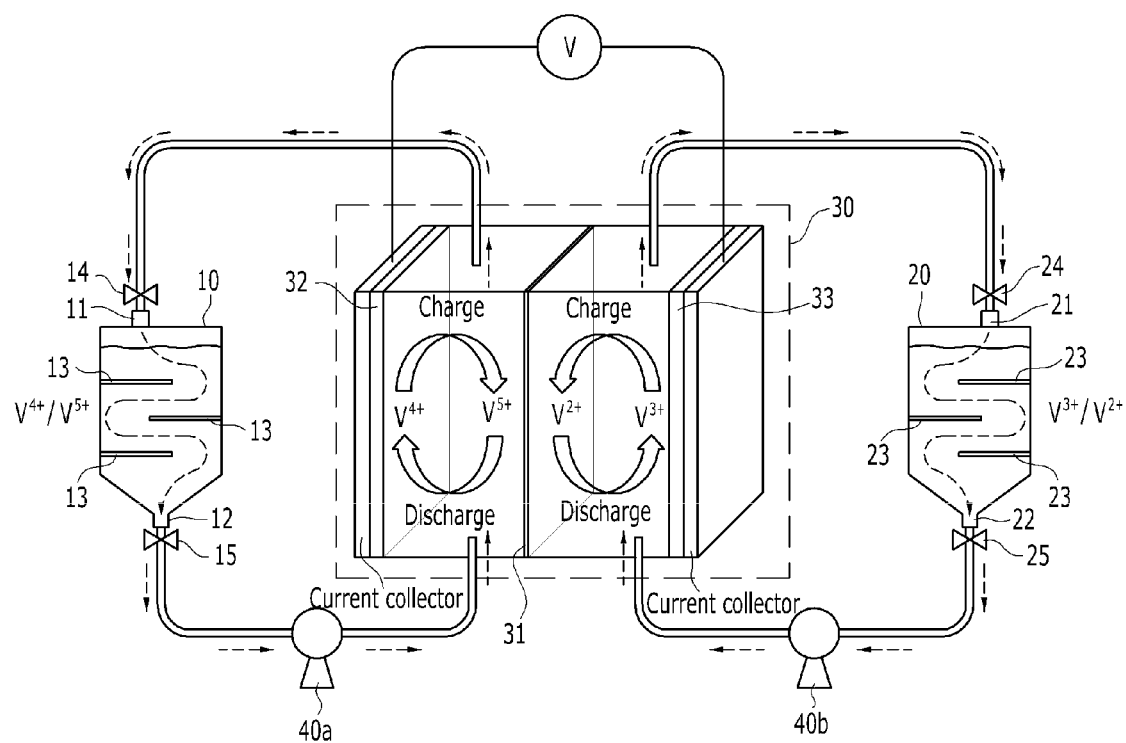
FIG. 1 schematically shows a redox flow battery according to an embodiment of the present disclosure.

Hereinafter, a detailed description will be given of the present disclosure with reference to the embodiments of the present disclosure and the drawings. These embodiments are merely set forth to illustrate the present disclosure but are not to be construed as limiting the scope of the present disclosure, as will be apparent to those skilled in the art.

Unless otherwise defined, all terms including technical and scientific terms used herein have the same meanings as those commonly understood by one of ordinary skill in the art to which the present disclosure belongs. In the case where the meanings thereof conflict, the description including the definitions herein shall prevail.

In order to clearly illustrate the disclosure proposed in the drawings, parts not related to the description are omitted, and similar parts are denoted by similar reference numerals throughout the specification. It is also to be understood that when any part is referred to as "comprising" or "including" any element, this does not exclude other elements, but may further include other elements unless otherwise stated. As used herein, the term "part" refers to a "unit" or "block" responsible for a specific function.

The ordinals ("first", "second", etc.) in individual steps are used for the sake of description and do not explain the order of the steps. Individual steps may be performed differently from the described order unless the specific order is explicitly stated in context. That is, the individual steps may be performed in the described order or in the reverse order, or may be conducted substantially simultaneously.

As used herein, the flow battery may refer to a flow battery comprising a variety of known active materials. For the sake of explanation, a vanadium flow battery is described as an example, but the present disclosure is not limited thereto.

FIG. 1 schematically shows a redox flow battery according to an embodiment of the present disclosure. With reference to FIG. 1, the redox flow battery according to an embodiment of the present disclosure includes a catholyte tank 10 having an electrolyte inlet 11 at the top thereof and an electrolyte outlet 12 at the bottom thereof and having a partition plate 13 for forming a concentration gradient of a catholyte received therein; an anolyte tank 20 having an electrolyte inlet 21 at the top thereof and an electrolyte outlet 22 at the bottom thereof and having a partition plate 23 for forming a concentration gradient of an anolyte received therein; and a stack 30 for charging and discharging power by receiving the catholyte and the anolyte supplied from the catholyte tank 10 and the anolyte tank 20. According to the present disclosure, the travel path of the electrolyte extends through the partition plate 13 provided in the tank to form a concentration gradient of the electrolyte in the tank, and the electrolyte having a higher reactant concentration may be transferred to the stack 30 during charging or discharging, thus lowering overpotential in the stack 30. Thereby, charging or discharging may be achieved with larger current, and voltage efficiency may be increased, ultimately increasing overall battery efficiency.

The catholyte tank 10 receives therein the catholyte, and may be formed in various shapes, including a cylindrical shape, etc. The top thereof is provided with the electrolyte inlet 11 to allow the catholyte to flow in, and the bottom thereof is provided with the electrolyte outlet 12 to allow the catholyte received therein to flow out. Furthermore, valves 14, 15 that adjust the opening and closing of flow passages may be provided upstream of the electrolyte inlet 11 and downstream of the electrolyte outlet 12, respectively. The partition plate 13 may be provided in the catholyte tank 10 to form a concentration gradient of the introduced catholyte. Specifically, the partition plate 13 may control the flow path of the catholyte so as to form the electrolyte concentration gradient until the catholyte introduced through the inlet 11 of the catholyte tank 10 flows out through the outlet 12. The partition plate 13 may be manufactured in any form, so long as it is able to control the flow path of the catholyte, and may be provided in the shape of, for example, a plate. The partition plate 13 is preferably formed in a horizontal direction as in FIG. 1 so as to enable efficient flow of the catholyte, and a plurality of partition plates may be provided. Here, the partition plates 13 are arranged in a horizontal direction so as to form a large catholyte concentration gradient by maximally elongating the flow path (e.g., zigzag flow) while achieving efficient flow of the catholyte, and adjacent partition plates 13 are preferably formed at opposite sides of the catholyte tank 10 on the basis of the longitudinal cross-section of the catholyte tank 10, as illustrated in FIG. 1.

The anolyte tank 20 receives therein the anolyte, and may be formed in various shapes, including a cylindrical shape, etc. The top thereof is provided with the electrolyte inlet 21 to allow the anolyte to flow in, and the bottom thereof is provided with the electrolyte outlet 22 to allow the received anolyte to flow out. Also, valves 24, 25 that adjust the opening and closing of flow passages may be provided respectively upstream of the electrolyte inlet 21 and downstream of the electrolyte outlet 22. The partition plate 23 may be provided in the anolyte tank 20 to form a concentration gradient of the introduced anolyte. Specifically, the partition plate 23 may control the flow path of the anolyte so as to form the electrolyte concentration gradient until the anolyte introduced through the inlet 21 of the anolyte tank 20 flows out through the outlet 22. The partition plate 23 may be manufactured in any form, so long as it is able to control the flow path of the anolyte, and may be provided in the shape of, for example, a plate. The partition plate 23 is preferably formed in a horizontal direction as in FIG. 1 so as to enable efficient flow of the anolyte, and a plurality of partition plates may be provided. Here, the partition plates 23 are arranged in a horizontal direction so as to form a large anolyte concentration gradient by maximally elongating the flow path (e.g., zigzag flow) while achieving efficient flow of the anolyte, and adjacent partition plates 23 are preferably formed at opposite sides of the anolyte tank 20 on the basis of the longitudinal cross-section of the anolyte tank 20, as illustrated in FIG. 1.

The stack 30 may include at least one battery cell. The battery cell may include an ion exchange membrane 31, and a cathode 32 and an anode 33 with the ion exchange membrane 31 positioned therebetween. The cathode 32 and the anode 33 may be manufactured using any of a variety of known materials, for example, graphite. The ion exchange membrane 31 is preferably inexpensive and exhibits high ion-selective permeability, low electrical resistance, a low solute/solvent diffusion coefficient, superior chemical stability, and excellent mechanical strength. Typically, Nafion (Dupont), CMV, AMV, DMV (Asahi Glass) and the like may be used. A vanadium redox flow battery requires a membrane having high acid resistance, high oxidation resistance and superior selective permeability because an active material comprising a mixture of a transition metal element and a strong acid is used as an electrolyte material. When a Nafion membrane is applied to a vanadium-based battery, energy efficiency may decrease due to the permeation of vanadium ions, and a CMV membrane has defects such as a short lifetime. Hence, with the goal of solving the above problems, an ion exchange membrane using an engineering plastic polymer having excellent mechanical properties in a strong acid atmosphere and in a high temperature range may be applied, and examples thereof may include PEEK (polyether ether ketone), PSF (polysulfone), PBI (polybenzimidazole), etc.

Also, respective pumps 40a, 40b for transferring the catholyte received in the catholyte tank 10 and the anolyte received in the anolyte tank 20 to the stack 30 may be further included.

Figure 2:
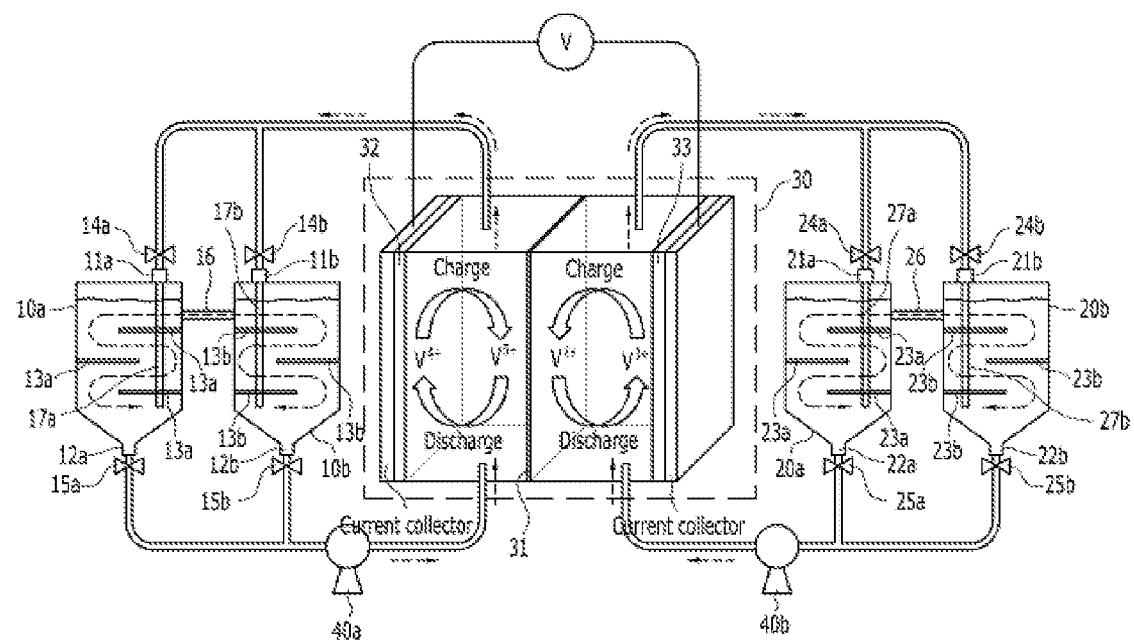
FIG. 2 schematically shows a redox flow battery according to an embodiment of the present disclosure.

FIG. 2 schematically shows a redox flow battery according to an embodiment of the present disclosure. With reference to FIG. 2, the redox flow battery according to an embodiment of the present disclosure includes a first catholyte tank 10a having an electrolyte inlet 11a at the top thereof and an electrolyte outlet 12a at the bottom thereof and having a partition plate 13a for forming a concentration gradient of a catholyte received therein; a second catholyte tank 10b having an electrolyte inlet 11b at the top thereof and an electrolyte outlet 12b at the bottom thereof and having a partition plate 13b for forming a concentration gradient of a catholyte received therein; a first anolyte tank 20a having an electrolyte inlet 21a at the top thereof and an electrolyte outlet 22a at the bottom thereof and having a partition plate 23a for forming a concentration gradient of an anolyte received therein; a second anolyte tank 20b having an electrolyte inlet 21b at the top thereof and an electrolyte outlet 22b at the bottom thereof and having a partition plate 23b for forming a concentration gradient of an anolyte received therein; and a stack 30 for charging and discharging power by receiving the catholyte and the anolyte supplied from the first and second catholyte tanks 10a, 10b and the first and second anolyte tanks 20a, 20b. According to the present disclosure, a plurality of catholyte tanks 10a, 10b and a plurality of anolyte tanks 20a, 20b are provided, and the travel path of the electrolyte extends through the partition plates 13a, 13b, 23a, 23b provided in the tanks to thus form a concentration gradient of the electrolyte in the tanks, and the electrolyte having a higher reactant concentration may be transferred to the stack 30 during charging or discharging, thus lowering overpotential in the stack. Thereby, charging or discharging may be achieved with larger current and voltage efficiency may be increased, ultimately increasing overall battery efficiency.

The first catholyte tank 10a receives therein the catholyte, and may be formed in various shapes, including a cylindrical shape, etc. The top thereof is provided with the electrolyte inlet 11a to allow the catholyte to flow in, and the bottom thereof is provided with the electrolyte outlet 12a to allow the catholyte received therein to flow out. Furthermore, valves 14a, 15a that adjust the opening and closing of flow passages may be provided respectively upstream of the electrolyte inlet 11a and downstream of the electrolyte outlet 12a. The partition plate 13a may be provided in the first catholyte tank 10a to form a concentration gradient of the introduced catholyte. Specifically, the partition plate 13a may control the flow path of the catholyte so as to form the electrolyte concentration gradient until the catholyte flows out through the outlet 12 from the inside of the first catholyte tank 10a. The partition plate 13a may be manufactured in any form, so long as it is able to control the flow path of the catholyte, and may be provided in the shape of, for example, a plate. The partition plate 13a is preferably formed in a horizontal direction as in FIG. 2 so as to enable the efficient flow of the catholyte, and a plurality of partition plates may be provided. Here, the partition plates 13a are arranged in a horizontal direction so as to form a large catholyte concentration gradient by maximally elongating the flow path (e.g., zigzag flow) while achieving efficient flow of the catholyte, and adjacent partition plates 13a are preferably formed at opposite sides of the first catholyte tank 10a on the basis of the longitudinal cross-section of the first catholyte tank 10a, as illustrated in FIG. 2.

The second catholyte tank 10b is structurally identical to the first catholyte tank 10a. Thus, a redundant description of corresponding portions is omitted, and the connection relationship between the first catholyte tank 10a and the second catholyte tank 10b, and the like, which have not been described above, are described.

The first catholyte tank 10a and the second catholyte tank 10b may be connected to each other through a connection pipe 16 so that the catholyte contained therein may move in both directions. Also, the first catholyte tank 10a and the second catholyte tank 10b respectively may have extension pipes 17a, 17b connected to the electrolyte inlets 11a, 11b so that the catholyte introduced into each tank through the electrolyte inlets 11a, 11b flows to the bottom of the tank. Here, when the catholyte flowing to the bottom of the tank moves to the adjacent tank through the connection pipe 16 and then flows out (for example, after flowing into the first catholyte tank 10a and then flowing out from the second catholyte tank 10b), the connection pipe 16 is preferably located at a position higher than the partition plates 13a, 13b (e.g., the highest partition plate among a plurality of partition plates) provided in the first catholyte tank 10a and the second catholyte tank 10b so that the travel path of the catholyte is as long as possible, thus forming a large concentration gradient.

The first anolyte tank 20a receives therein the anolyte, and may be formed in various shapes, including a cylindrical shape, etc. The top thereof is provided with the electrolyte inlet 21a to allow the anolyte to flow in, and the bottom thereof is provided with the electrolyte outlet 22a to allow the received anolyte to flow out. Also, valves 24a, 25a that adjust the opening and closing of flow passages may be provided respectively upstream of the electrolyte inlet 21a and downstream of the electrolyte outlet 22a. The partition plate 23a may be provided in the first anolyte tank 20a to form a concentration gradient of the introduced anolyte. Specifically, the partition plate 23a may control the flow path of the anolyte so as to form the electrolyte concentration gradient until the anolyte flows out through the outlet 22a from the inside of the first anolyte tank 20a. The partition plate 23a may be manufactured in any form, so long as it is able to control the flow path of the anolyte, and may be provided in the shape of, for example, a plate. The partition plate 23a is preferably formed in a horizontal direction as in FIG. 2 so as to enable efficient flow of the anolyte, and a plurality of partition plates may be provided. Here, the partition plates 23a are arranged in a horizontal direction so as to form a large anolyte concentration gradient by maximally elongating the flow path (e.g., zigzag flow) while achieving efficient flow of the anolyte, and adjacent partition plates 23a are preferably joined to opposite sides of the first anolyte tank 20a on the basis of the longitudinal cross-section of the first anolyte tank 20a, as illustrated in FIG. 2.

The second anolyte tank 20b is structurally identical to the first anolyte tank 20a. Thus, a redundant description of corresponding portions is omitted, and the connection relationship between the first anolyte tank 20a and the second anolyte tank 20b, and the like, which have not been described above, are described.

The first anolyte tank 20a and the second anolyte tank 20b may be connected to each other through a connection pipe 26 so that the anolyte contained therein may move in both directions. Also, the first anolyte tank 20a and the second anolyte tank 20b respectively may have extension pipes 27a, 27b connected to the electrolyte inlets 21a, 21b so that the anolyte introduced into each tank through the electrolyte inlets 21a, 21b flows to the bottom of the tank. Here, when the anolyte flowing to the bottom of the tank moves to the adjacent tank through the connection pipe 26 and then flows out (for example, after flowing into the first anolyte tank 20a and then flowing out from the second anolyte tank 20b), the connection pipe 26 is preferably located at a position higher than the partition plates 23a, 23b (e.g., the highest partition plate among a plurality of partition plates) provided in the first anolyte tank 20a and the second anolyte tank 20b so that the travel path of the anolyte is as long as possible, thus forming a large concentration gradient.

The stack 30 may include at least one battery cell. The battery cell may include an ion exchange membrane 31, and a cathode 32 and an anode 33 with the ion exchange membrane 31 positioned therebetween. The cathode 32 and the anode 33 may be manufactured using any of a variety of known materials, for example, graphite. The ion exchange membrane 31 is preferably inexpensive and exhibits high ion-selective permeability, low electrical resistance, a low solute/solvent diffusion coefficient, superior chemical stability, and excellent mechanical strength. Typically, Nafion (Dupont), CMV, AMV, DMV (Asahi Glass) and the like may be used. A vanadium redox flow battery requires a membrane having high acid resistance, oxidation resistance and selective permeability because an active material comprising a mixture of a transition metal element and a strong acid is used as an electrolyte material. When a Nafion membrane is applied to a vanadium-based battery, energy efficiency may decrease due to the permeation of vanadium ions, and a CMV membrane has defects such as a short lifetime. Hence, with the goal of solving the above problems, an ion exchange membrane using an engineering plastic polymer having excellent mechanical properties in a strong acid atmosphere and in a high temperature range may be applied, and examples thereof may include PEEK (polyether ether ketone), PSF (polysulfone), PBI (polybenzimidazole), etc.

Also, respective pumps 40a, 40b for transferring the catholyte received in the first and second catholyte tanks 10a, 10b and the anolyte received in the first and second anolyte tanks 20a, 20b to the stack 30 may be further included.

Figure 3:
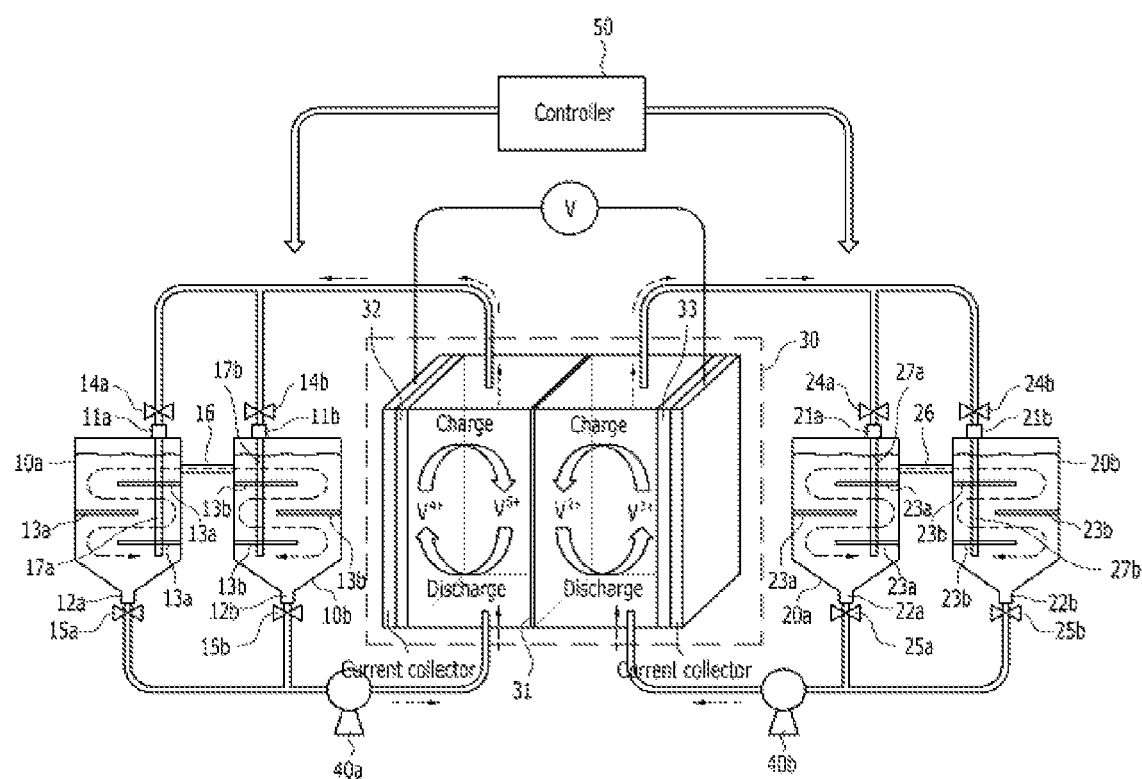
FIG. 3 schematically shows a redox flow battery according to an embodiment of the present disclosure.
Figure 4:
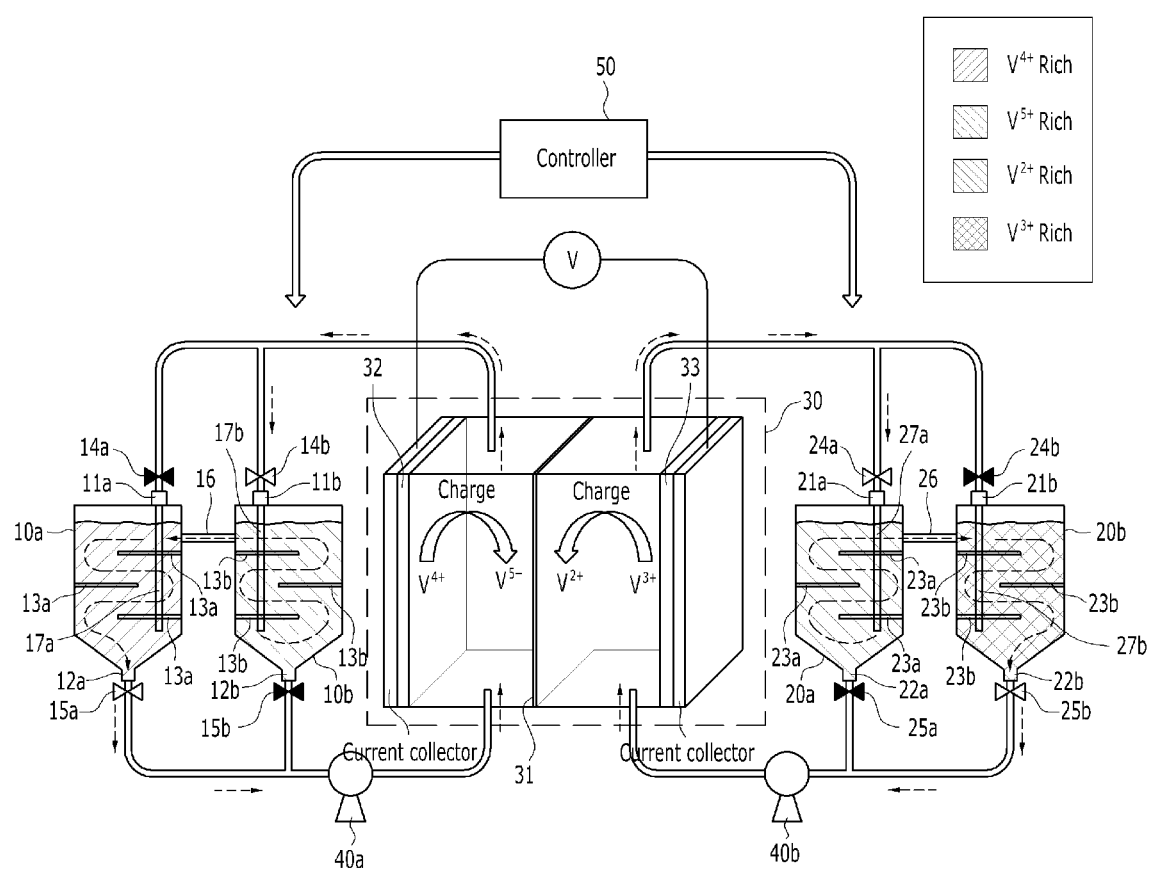
FIG. 4 schematically shows a process of charging the redox flow battery of FIG. 3.
Figure 5:
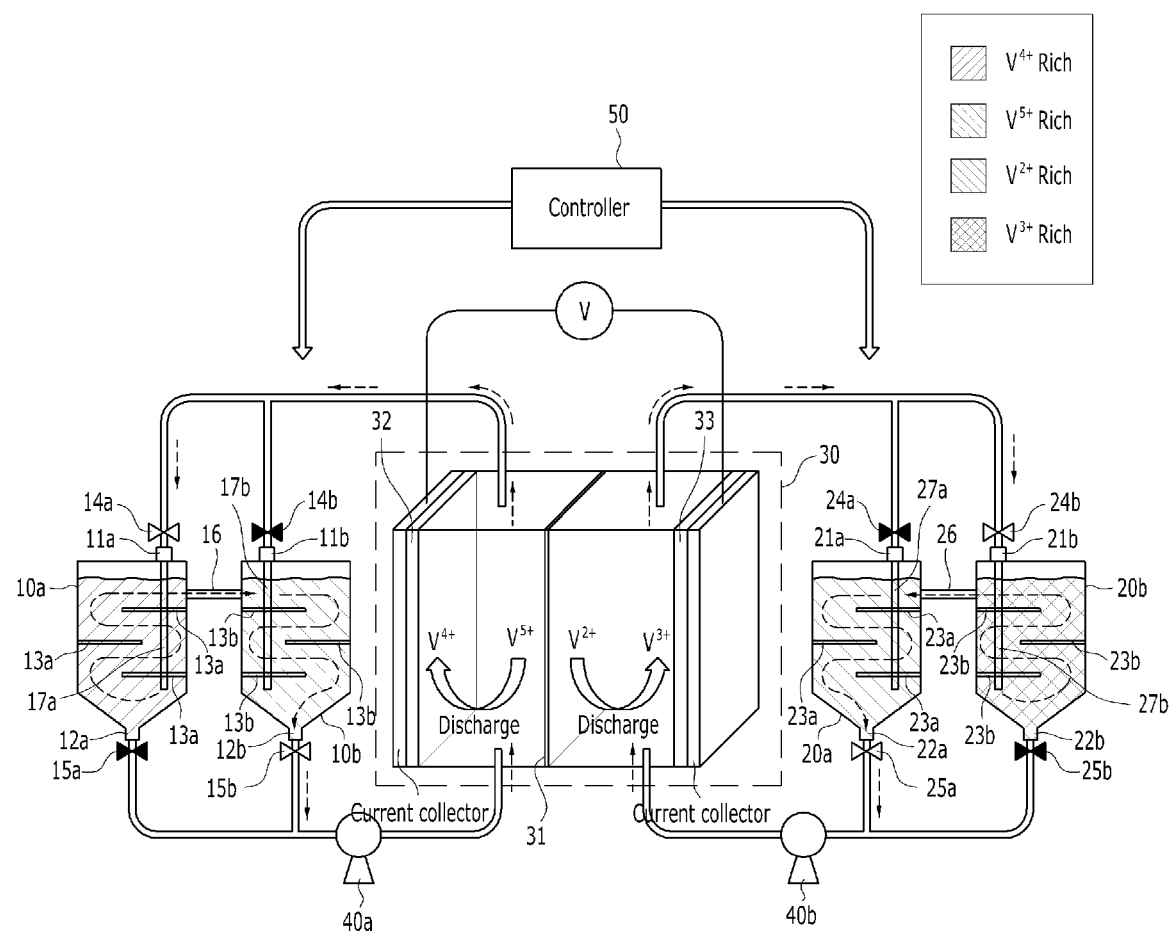
FIG. 5 schematically shows a process of discharging the redox flow battery of FIG. 3.

FIG. 3 schematically shows a redox flow battery according to an embodiment of the present disclosure. With reference to FIG. 3, the redox flow battery according to an embodiment of the present disclosure may further include a controller 50, in addition to the redox flow battery of FIG. 2. The controller 50 may control valves 14a, 14b, 15a, 15b, 24a, 24b, 25a, 25b provided to electrolyte flow passages respectively connected to the first and second catholyte tanks 10a, 10b and the first and second anolyte tanks 20a, 20b so as to adjust the opening and closing of the flow passages. FIGS. 4 and 5 schematically show the charging process and the discharging process of the redox flow battery of FIG. 3, respectively. With reference to FIGS. 4 and 5, the controller 50 is specifically described. The configuration of elements other than the controller 50 has been described above, and a redundant description thereof is thus omitted.

As shown in FIG. 4, the process of charging the vanadium redox flow battery is described. During charging, $V^{4+}$ ions are oxidized into $V^{5+}$ ions at the cathode and $V^{3+}$ ions are reduced into $V^{2+}$ ions at the anode. Under the set condition that the first catholyte tank 10a receives the $V^{4+}$-rich catholyte, the second catholyte tank 10b receives the $V^{5+}$-rich catholyte, the first anolyte tank 20a receives the $V^{2+}$-rich anolyte, and the second anolyte tank 20b receives the V$^{3+}$-rich anolyte, the controller 50 functions to close the outlet valve 15b of the second catholyte tank 10b and the outlet valve 25a of the first anolyte tank 20a and to open the outlet valve 15a of the first catholyte tank 10a and the outlet valve 25b of the second anolyte tank 20b so that the V$^{4+}$-rich catholyte and the V$^{3+}$-rich anolyte may move to the stack 30. When charging takes place in the stack 30, the catholyte and the anolyte are converted into the V$^{5+}$-rich state and the V$^{2+}$-rich state, respectively, and the controller 50 functions to close the inlet valve 14a of the first catholyte tank 10a and the inlet valve 24b of the second anolyte tank 20b and to open the inlet valve 14b of the second catholyte tank 10b and the inlet valve 24a of the first anolyte tank 10a, whereby the V$^{5+}$-rich catholyte and the V$^{2+}$-rich anolyte flow into the second catholyte tank 10b and the first anolyte tank 20a, respectively. The V$^{5+}$-rich catholyte flows into the second catholyte tank 10b and thus the V$^{4+}$-rich catholyte is still received in the first catholyte tank 10a, and during the charging process, the V$^{4+}$-rich catholyte may continue to flow into the stack 30. For the same reason, the V$^{2+}$-rich anolyte flows into the first anolyte tank 20a and thus the V$^{3+}$-rich anolyte is still received in the second anolyte tank 20b, and during the charging process, the V$^{3+}$-rich anolyte may continue to flow into the stack 30. Accordingly, the redox flow battery of the disclosure may be charged at low OCV (Open Circuit Voltage) compared to when using a single tank or a tank having no partition plate.

Next, the discharging process is described with reference to FIG. 5. During discharging, V$^{5+}$ ions are reduced into V$^{4+}$ ions at the cathode and the V$^{2+}$ ions are oxidized into V$^{3+}$ ions at the anode. Under the set condition that the first catholyte tank 10a receives the V$^{4+}$-rich catholyte, the second catholyte tank 10b receives the V$^{5+}$-rich catholyte, the first anolyte tank 20a receives the V$^{2+}$-rich anolyte, and the second anolyte tank 20b receives the V$^{3+}$-rich anolyte, the controller 50 functions to close the outlet valve 15a of the first catholyte tank 10a and the outlet valve 25b of the second anolyte tank 20b and to open the outlet valve 15b of the second catholyte tank 10b and the outlet valve 25a of the first anolyte tank 20a so that the V$^{5+}$-rich catholyte and the V$^{2+}$-rich anolyte may move to the stack 30. When discharging takes place in the stack 30, the catholyte and the anolyte are converted into the V$^{4+}$-rich state and the V$^{3+}$-rich state, respectively, and the controller 50 functions to close the inlet valve 14b of the second catholyte tank 10b and the inlet valve 24a of the first anolyte tank 20a and to open the inlet valve 14a of the first catholyte tank 10a and the inlet valve 24b of the second anolyte tank 20b, whereby the V$^{4+}$-rich catholyte and the V$^{3+}$-rich anolyte flow into the first catholyte tank 10a and the second anolyte tank 20b, respectively. The V$^{4+}$-rich catholyte flows into the first catholyte tank 10a and thus the V$^{5+}$-rich catholyte is still received in the second catholyte tank 10b, and during the discharging process, the V$^{5+}$-rich catholyte may continue to flow into the stack 30. For the same reason, the V$^{3+}$-rich anolyte flows into the second anolyte tank 20b and thus the V$^{2+}$-rich anolyte is still received in the first anolyte tank 20a, and during the discharging process, the V$^{2+}$-rich anolyte may continue to flow into the stack 30. Accordingly, the redox flow battery of the disclosure may be discharged at high OCV (Open Circuit Voltage) compared to when using a single tank or a tank having no partition plate.

Consequently, the redox flow battery of the present disclosure using the electrolyte concentration gradient may operate at low voltage during charging and at high voltage during discharging compared to the OCV of a conventional redox flow battery, thus causing the voltage to reach the high limit or the low limit more slowly, thereby effectively realizing longer operation of the redox flow battery with larger power (e.g., battery efficiency improvement).

Figure 9:
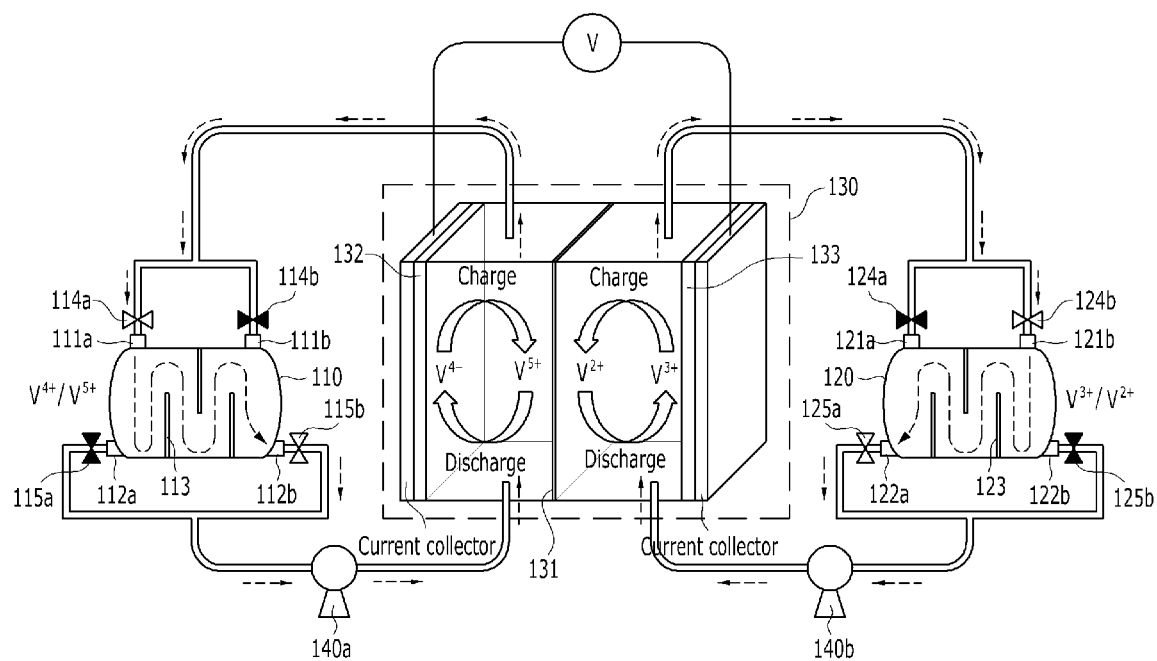
FIG. 9 schematically shows a redox flow battery according to an embodiment of the present disclosure.

FIG. 9 schematically shows a redox flow battery according to an embodiment of the present disclosure. With reference to FIG. 9, the redox flow battery according to an embodiment of the present disclosure includes a catholyte tank 110 having electrolyte inlets 111a, 111b at the top thereof and electrolyte outlets 112a, 112b at the bottom thereof and having a barrier rib 113 provided in a vertical direction to form a concentration gradient of a catholyte received therein; an anolyte tank 120 having electrolyte inlets 121a, 121b at the top thereof and electrolyte outlets 122a, 122b at the bottom thereof and having a barrier rib 123 provided in a vertical direction to form a concentration gradient of an anolyte received therein; and a stack 130 for charging and discharging power by receiving the catholyte and the anolyte supplied from the catholyte tank 110 and the anolyte tank 120. According to the present disclosure, the travel path of the electrolyte extends through the barrier rib 113 provided in the tank to thus form a concentration gradient of the electrolyte in the tank, and the electrolyte having a higher reactant concentration may be transferred to the stack 30 during charging or discharging, thus lowering overpotential in the stack 30. In particular, the electrolyte circulation may be blocked through the barrier rib provided in a vertical direction even when the redox flow battery is not in use to thus maintain the electrolyte concentration gradient, and furthermore, when the flow rate of the electrolyte increases during the operation of the redox flow battery, the electrolyte may flow over the barrier rib, thus preventing the pressure drop caused by an increase in the flow velocity in the narrow flow passage. Thereby, charging or discharging may be achieved with larger current and voltage efficiency may be increased, ultimately increasing overall battery efficiency.

The catholyte tank 110 receives therein the catholyte, and may be formed in various shapes. The top thereof is provided with the electrolyte inlets 111a, 111b to allow the catholyte to flow in, and the bottom thereof is provided with the electrolyte outlets 112a, 112b to allow the catholyte received therein to flow out. Furthermore, valves 114a, 114b, 115a, 115b that adjust the opening and closing of flow passages may be provided respectively upstream of the electrolyte inlets 111a, 111b and downstream of the electrolyte outlets 112a, 112b. The barrier rib 113 may be provided in the catholyte tank 110 to form a concentration gradient of the introduced catholyte. Specifically, the barrier rib 113 may control the flow path of the catholyte so as to form the electrolyte concentration gradient until the catholyte introduced through the inlet 111a, 111b of the catholyte tank 110 flows out through the outlet 112a, 112b. The barrier rib 113 may be manufactured in any form, so long as it is able to control the flow path of the catholyte, and may be provided in the shape of, for example, a plate. The barrier rib 113 is preferably formed in a vertical direction (e.g., the longitudinal direction in FIG. 9) so as to enable efficient flow of the catholyte, and a plurality of barrier ribs may be provided. Here, the barrier ribs 113 are arranged in a vertical direction so as to form a large catholyte concentration gradient by maximally elongating the flow path (e.g., zigzag flow) while achieving efficient flow of the catholyte, and adjacent barrier ribs 113 are preferably formed at opposite sides of the catholyte tank 110 on the basis of the transverse cross-section of the catholyte tank 10 (FIG. 9).

The anolyte tank 120 receives therein the anolyte, and may be formed in various shapes. The top thereof is provided with the electrolyte inlets 121a, 121b to allow the anolyte to flow in, and the bottom thereof is provided with the electrolyte outlets 122a, 122b to allow the received anolyte to flow out. Also, valves 124a, 124b, 125a, 125b that adjust the opening and closing of flow passages may be provided respectively upstream of the electrolyte inlets 121a, 121b and downstream of the electrolyte outlets 122a, 122b. The barrier rib 123 may be provided in the anolyte tank 120 to form a concentration gradient of the introduced anolyte. Specifically, the barrier rib 123 may control the flow path of the anolyte so as to form the electrolyte concentration gradient until the anolyte introduced through the inlets 121a, 121b of the anolyte tank 120 flows out through the outlets 122a, and 122b. The barrier rib 123 may be manufactured in any form, so long as it is able to control the flow path of the anolyte, and may be provided in the shape of, for example, a plate. The barrier rib 123 is preferably formed in a vertical direction (e.g., the longitudinal direction in FIG. 9) so as to enable efficient flow of the anolyte, and a plurality of barrier ribs may be provided. Here, the barrier ribs 123 are arranged in a vertical direction so as to form a large anolyte concentration gradient by maximally elongating the flow path (e.g., zigzag flow) while achieving efficient flow of the anolyte, and adjacent barrier ribs 123 are preferably formed at opposite sides of the anolyte tank 120 on the basis of the transverse cross-section of the anolyte tank 120 (FIG. 9).

The stack 130 may include at least one battery cell. The battery cell may include an ion exchange membrane 131, and a cathode 132 and an anode 133 with the ion exchange membrane 131 positioned therebetween. The cathode 132 and the anode 133 may be manufactured using any of a variety of known materials, for example, graphite. The ion exchange membrane 131 is preferably inexpensive and exhibits high ion-selective permeability, low electrical resistance, a low solute/solvent diffusion coefficient, superior chemical stability, and excellent mechanical strength. Typically, Nafion (Dupont), CMV, AMV, DMV (Asahi Glass) and the like may be used. A vanadium redox flow battery requires a membrane having high acid resistance, oxidation resistance and selective permeability because an active material comprising a mixture of a transition metal element and a strong acid is used as an electrolyte material. When a Nafion membrane is applied to a vanadium-based battery, energy efficiency may decrease due to the permeation of vanadium ions, and a CMV membrane has defects such as a short lifetime. Hence, with the goal of solving the above problems, an ion exchange membrane using an engineering plastic polymer having excellent mechanical properties in a strong acid atmosphere and in a high temperature range may be applied, and examples thereof may include PEEK (polyether ether ketone), PSF (polysulfone), PBI (polybenzimidazole), etc.

Also, respective pumps 140a, 140b for transferring the catholyte received in the catholyte tank 110 and the anolyte received in the anolyte tank 120 to the stack 130 may be further included.

Figure 10:
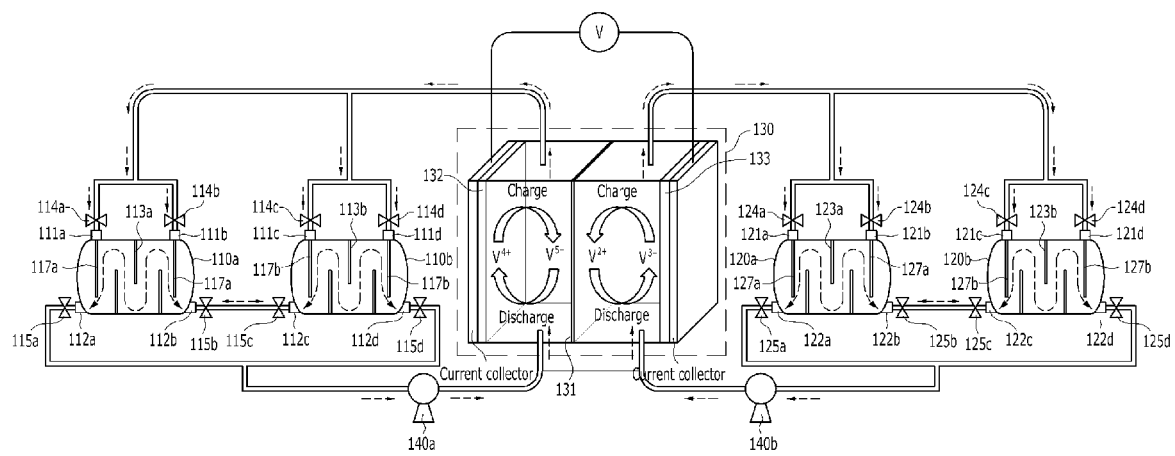
FIG. 10 schematically shows a redox flow battery according to an embodiment of the present disclosure.

FIG. 10 schematically shows a redox flow battery according to an embodiment of the present disclosure. With reference to FIG. 10, the redox flow battery according to an embodiment of the present disclosure includes a first catholyte tank 110a having electrolyte inlets 111a, 111b at the top thereof and electrolyte outlets 112a, 112b at the bottom thereof and having a barrier rib 113a provided in a vertical direction to form a concentration gradient of a catholyte received therein; a second catholyte tank 110b having electrolyte inlets 111c, 111d at the top thereof and electrolyte outlets 112c, 112d at the bottom thereof and having a barrier rib 113b for forming a concentration gradient of a catholyte received therein; a first anolyte tank 120a having electrolyte inlets 121a, 121b at the top thereof and electrolyte outlets 122a, 122b at the bottom thereof and having a barrier rib 123a provided in a vertical direction to form a concentration gradient of an anolyte received therein; a second anolyte tank 120b having electrolyte inlets 121c, 121d at the top thereof and electrolyte outlets 122c, 122d at the bottom thereof and having a barrier rib 123b provided in a vertical direction to form a concentration gradient of an anolyte received therein; and a stack 130 for charging and discharging power by receiving the catholyte and the anolyte supplied from the first and second catholyte tanks 110a, 110b and the first and second anolyte tanks 120a, 120b. According to the present disclosure, a plurality of catholyte tanks 110a, 110b and a plurality of anolyte tanks 120a, 120b are provided, and the travel path of the electrolyte extends through the barrier ribs 113a, 113b, 123a, 123b provided in the tanks to thus form a concentration gradient of the electrolyte in the tanks, and the electrolyte having a higher reactant concentration may be transferred to the stack 130 during charging or discharging, thus lowering overpotential in the stack 130. Thereby, charging or discharging may be achieved with larger current, and voltage efficiency may be increased, ultimately increasing overall battery efficiency.

The first catholyte tank 110a receives therein the catholyte, and may be formed in various shapes. The top thereof is provided with the electrolyte inlets 111a, 111b to allow the catholyte to flow in, and the bottom thereof is provided with the electrolyte outlets 112a, 112b to allow the catholyte received therein to flow out. Furthermore, valves 114a, 114b, 115a, 115b that adjust the opening and closing of flow passages may be provided respectively upstream of the electrolyte inlets 111a, 111b and downstream of the electrolyte outlets 112a, 112b. The barrier rib 113a may be provided in the first catholyte tank 110a to form a concentration gradient of the introduced catholyte. Specifically, the barrier rib 113a may control the flow path of the catholyte so as to form the electrolyte concentration gradient until the catholyte flows out through the outlets 112a, 112b from the inside of the first catholyte tank 110a. The barrier rib 113a may be manufactured in any form, so long as it is able to control the flow path of the catholyte, and may be provided in the shape of, for example, a plate. The barrier rib 113a is preferably formed in a vertical direction (e.g., the longitudinal direction in FIG. 10) so as to enable efficient flow of the catholyte, and a plurality of barrier ribs may be provided. Here, the barrier ribs 113a are arranged in a vertical direction so as to form a large catholyte concentration gradient by maximally elongating the flow path (e.g., zigzag flow) while achieving efficient flow of the catholyte, and adjacent barrier ribs 113a are preferably joined to opposite sides of the first catholyte tank 110a on the basis of the transverse cross-section of the first catholyte tank 110a (FIG. 10).

The second catholyte tank 110b is structurally identical to the first catholyte tank 110a. Thus, a redundant description of corresponding portions is omitted, and the connection relationship between the first catholyte tank 110a and the second catholyte tank 110b, and the like, which have not been described above, are described below.

The first catholyte tank 110a and the second catholyte tank 110b may be connected to each other through a connection pipe 116 so that the catholyte contained therein may move in both directions. Also, the first catholyte tank 110a and the second catholyte tank 110b respectively may have extension pipes 117a, 117b connected to the electrolyte inlets 111a, 111b, 111c, 111d so that the catholyte introduced into each tank through the electrolyte inlets 111a, 111b, 111c, 111d flows to the bottom of the tank. Here, when the catholyte flowing to the bottom of the tank moves to the adjacent tank through the connection pipe 116 and then flows out (for example, after flowing into the first catholyte tank 110a and then flowing out from the second catholyte tank 110b), it is preferred that the travel path of the catholyte be as long as possible so that a large concentration gradient is formed.

The first anolyte tank 120a receives therein the anolyte, and may be formed in various shapes. The top thereof is provided with the electrolyte inlets 121a, 121b to allow the anolyte to flow in, and the bottom thereof is provided with the electrolyte outlets 122a, 122b to allow the received anolyte to flow out. Also, valves 124a, 124b, 125a, 125b that adjust the opening and closing of flow passages may be provided respectively upstream of the electrolyte inlets 121a, 121b and downstream of the electrolyte outlets 122a, 122b. The barrier rib 123a may be provided in the first anolyte tank 120a to form a concentration gradient of the introduced anolyte. Specifically, the barrier rib 123a may control the flow path of the anolyte so as to form the electrolyte concentration gradient until the anolyte flows out through the outlets 122a, 122b from the inside of the first anolyte tank 120a. The barrier rib 123a may be manufactured in any form, so long as it is able to control the flow path of the anolyte, and may be provided in the shape of, for example, a plate. The barrier rib 123a is preferably formed in a vertical direction (e.g., the longitudinal direction in FIG. 10) so as to enable efficient flow of the anolyte, and a plurality of barrier ribs may be provided. Here, the barrier ribs 123a are arranged in a vertical direction so as to form a large anolyte concentration gradient by maximally elongating the flow path (e.g., zigzag flow) while achieving efficient flow of the anolyte, and adjacent barrier ribs 123a are preferably joined to opposite sides of the first anolyte tank 120a on the basis of the transverse cross-section of the first anolyte tank 120a (FIG. 10).

The second anolyte tank 120b is structurally identical to the first anolyte tank 120a. Thus, a redundant description of corresponding portions is omitted, and the connection relationship between the first anolyte tank 120a and the second anolyte tank 120b, and the like, which have not been described above, are described below.

The first anolyte tank 120a and the second anolyte tank 120b may be connected to each other through a connection pipe 126 so that the anolyte contained therein may move in both directions. Also, the first anolyte tank 120a and the second anolyte tank 120b respectively may have extension pipes 127a, 127b connected to the electrolyte inlets 121a, 121b, 121c, 121d so that the anolyte introduced into each tank through the electrolyte inlets 121a, 121b, 121c, 121d flows to the bottom of the tank. Here, when the anolyte flowing to the bottom of the tank moves to the adjacent tank through the connection pipe 126 and then flows out (for example, after flowing into the first anolyte tank 120a and then flowing out from the second anolyte tank 120b), it is preferred that the travel path of the anolyte be as long as possible so that a large concentration gradient is formed.

The stack 130 may include at least one battery cell. The battery cell may include an ion exchange membrane 131, and a cathode 132 and an anode 133 with the ion exchange membrane 131 positioned therebetween. The cathode 132 and the anode 133 may be manufactured using any of a variety of known materials, for example, graphite. The ion exchange membrane 131 is preferably inexpensive and exhibits high ion-selective permeability, low electrical resistance, a low solute/solvent diffusion coefficient, superior chemical stability, and excellent mechanical strength. Typically, Nafion (Dupont), CMV, AMV, DMV (Asahi Glass) and the like may be used. A vanadium redox flow battery requires a membrane having high acid resistance, oxidation resistance and selective permeability because an active material comprising a mixture of a transition metal element and a strong acid is used as an electrolyte material. When a Nafion membrane is applied to a vanadium-based battery, energy efficiency may decrease due to the permeation of vanadium ions, and a CMV membrane has defects such as a short lifetime. Hence, in order to solve the above problems, an ion exchange membrane using an engineering plastic polymer having excellent mechanical properties in a strong acid atmosphere and in a high temperature range may be applied, and examples thereof may include PEEK (polyether ether ketone), PSF (polysulfone), PBI (polybenzimidazole), etc.

Also, respective pumps 140a, 140b for transferring the catholyte received in the first and second catholyte tanks 110a, 110b and the anolyte received in the first and second anolyte tanks 120a, 120b to the stack 130 may be further included.

Figure 11:
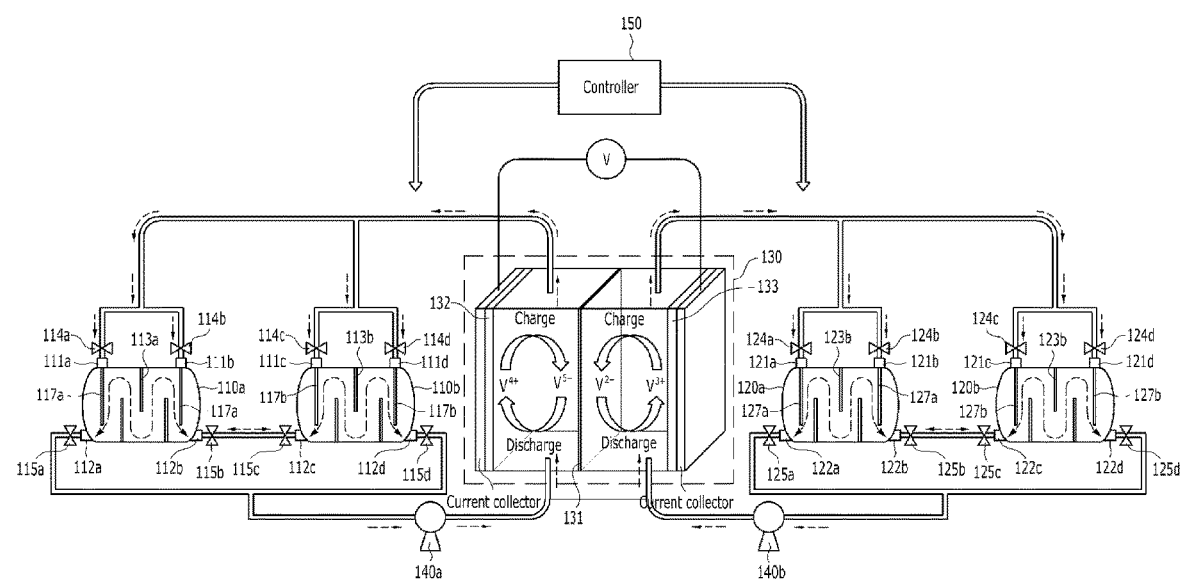
FIG. 11 schematically shows a redox flow battery according to an embodiment of the present disclosure.
Figure 12:
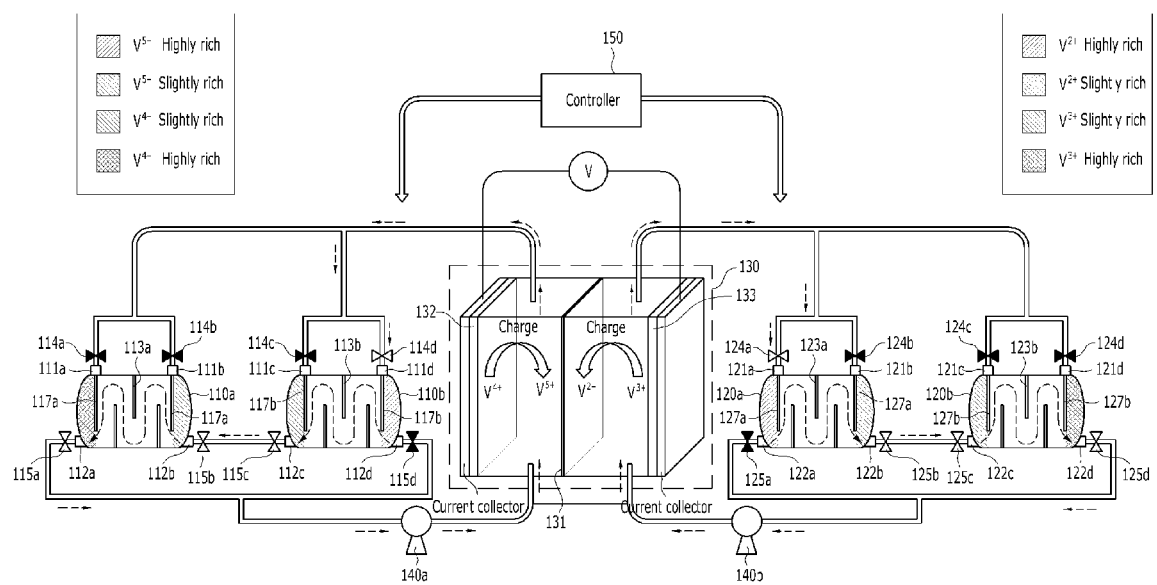
FIG. 12 schematically shows a process of charging the redox flow battery of FIG. 11.
Figure 13:
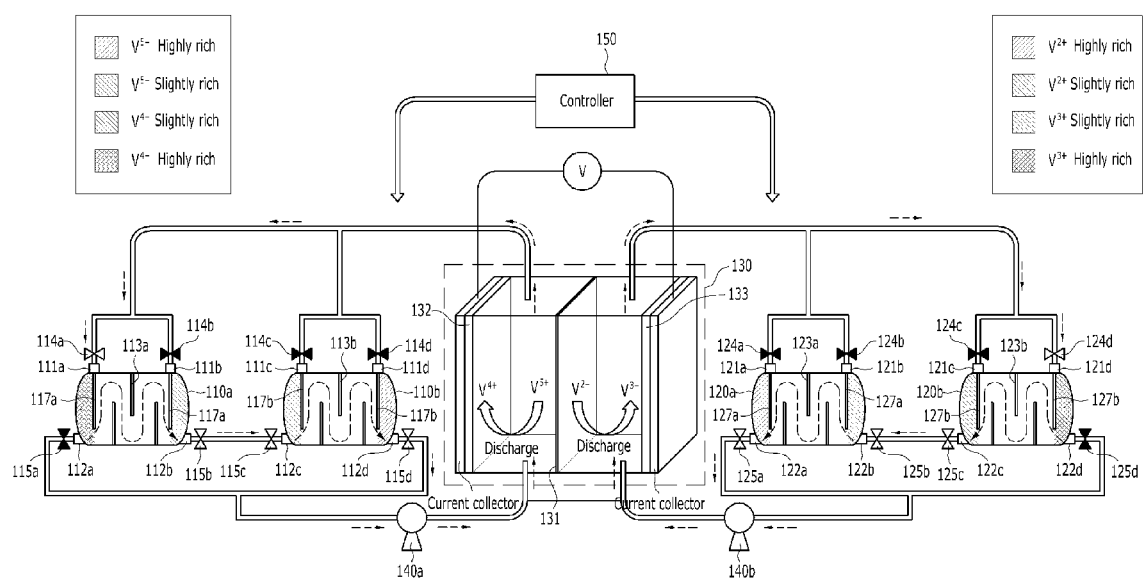
FIG. 13 schematically shows a process of discharging the redox flow battery of FIG. 11.

FIG. 11 schematically shows a redox flow battery according to an embodiment of the present disclosure. With reference to FIG. 11, the redox flow battery according to an embodiment of the present disclosure may further include a controller 150, in addition to the redox flow battery of FIG. 10. The controller 150 may control valves 114a, 114b, 114c, 114d, 115a, 115b, 115c, 115d, 124a, 124b, 124c, 124d, 125a, 125b, 125c, 125d provided to electrolyte flow passages connected to the first and second catholyte tanks 110a, 110b and the first and second anolyte tanks 120a, 120b so as to adjust the opening and closing of the flow passages. FIGS. 12 and 13 schematically show the charging process and the discharging process of the redox flow battery of FIG. 11, respectively. With reference to FIGS. 12 and 13, the controller 150 is specifically described. The configuration of elements other than the controller 150 has been described above, and a redundant description thereof is thus omitted.

As shown in FIG. 12, the process of charging the vanadium redox flow battery is described. During charging, $V^{4+}$ ions are oxidized into $V^{5+}$ ions at the cathode and $V^{3+}$ ions are reduced into $V^{2+}$ ions at the anode. Under the set condition that the first catholyte tank 110a receives the $V^{4+}$-rich catholyte, the second catholyte tank 110b receives the $V^{5+}$-rich catholyte, the first anolyte tank 120a receives the $V^{2+}$-rich anolyte, and the second anolyte tank 120b receives the $V^{3+}$-rich anolyte, the controller 150 functions to close the outlet valve 115d of the second catholyte tank 110b and the outlet valve 125a of the first anolyte tank 120a and to open the outlet valve 115a of the first catholyte tank 110a and the outlet valve 125d of the second anolyte tank 120b so that the $V^{4+}$-rich catholyte and the $V^{3+}$-rich anolyte may move to the stack 130. When charging takes place in the stack 130, the catholyte and the anolyte are converted into the $V^{5+}$-rich state and the $V^{2+}$-rich state, respectively, and the controller 150 functions to close the inlet valves 114a, 114b of the first catholyte tank 110a and the inlet valves 124c, 124d of the second anolyte tank 120b and to open the inlet valve 114d of the second catholyte tank 110b and the inlet valve 124a of the first anolyte tank 120a (the valves 114c, 124b are closed), whereby the $V^{5+}$-rich catholyte and the $V^{2+}$-rich anolyte flow into the second catholyte tank 110b and the first anolyte tank 120a, respectively. The $V^{5+}$-rich catholyte flows into the second catholyte tank 110b and thus the $V^{4+}$-rich catholyte is still received in the first catholyte tank 110a, and during the charging process, the $V^{4+}$-rich catholyte may continue to flow into the stack 130. For the same reason, the $V^{2+}$-rich anolyte flows into the first anolyte tank 120a, and thus the $V^{3+}$-rich anolyte is still received in the second anolyte tank 120b, and during the charging process, the $V^{3+}$-rich anolyte may continue to flow into the stack 130. Accordingly, the redox flow battery of the disclosure may be charged at low OCV (Open Circuit Voltage) compared to the case of using a single tank or a tank having no partition plate.

Next, the discharging process is described with reference to FIG. 13. During discharging, $V^{5+}$ ions are reduced into $V^{4+}$ ions at the cathode and the $V^{2+}$ ions are oxidized into $V^{3+}$ ions at the anode. Under the set condition that the first catholyte tank 110a receives the $V^{4+}$-rich catholyte, the second catholyte tank 110b receives the $V^{5+}$-rich catholyte, the first anolyte tank 120a receives the $V^{2+}$-rich anolyte, and the second anolyte tank 120b receives the $V^{3+}$-rich anolyte, the controller 150 functions to close the outlet valve 115a of the first catholyte tank 110a and the outlet valve 125d of the second anolyte tank 120b and to open the outlet valve 115d of the second catholyte tank 110b and the outlet valve 125a of the first anolyte tank 120a so that the $V^{5+}$-rich catholyte and the $V^{2+}$-rich anolyte may move to the stack 130. When discharging takes place in the stack 130, the catholyte and the anolyte are converted into the $V^{4+}$-rich state and the $V^{3+}$-rich state, respectively, and the controller 150 functions to close the inlet valves 114c, 114d of the second catholyte tank 110b and the inlet valves 124a, 124b of the first anolyte tank 120a and to open the inlet valve 114a of the first catholyte tank 110a and the inlet valve 124d of the second anolyte tank 120b (the valves 114b, 124c are closed), whereby the $V^{4+}$-rich catholyte and the $V^{3+}$-rich anolyte flow into the first catholyte tank 110a and the second anolyte tank 120b, respectively. The $V^{4+}$-rich catholyte flows into the first catholyte tank 110a and thus the $V^{5+}$-rich catholyte is still received in the second catholyte tank 110b, and during the discharging process, the $V^{5+}$-rich catholyte may continue to flow into the stack 130. For the same reason, the $V^{3+}$-rich anolyte flows into the second anolyte tank 120b and thus the $V^{2+}$-rich anolyte is still received in the first anolyte tank 120a, and during the discharging process, the $V^{2+}$-rich anolyte may continue to flow into the stack 130. Accordingly, the redox flow battery of the disclosure may be discharged at high OCV (Open Circuit Voltage) compared to the case of using a single tank or a tank having no partition plate.

Consequently, the redox flow battery of the present disclosure using the electrolyte concentration gradient may operate at low voltage during charging and high voltage during discharging compared to the OCV of a conventional redox flow battery, thus causing the voltage to reach the high limit or the low limit more slowly, thereby effectively realizing longer operation of the redox flow battery with larger power (battery efficiency improvement).

A better understanding of the configuration and effects of the present disclosure will be given through the following examples and comparative examples. However, the present examples are merely set forth to illustrate the present disclosure, and are not to be construed as limiting the scope of the present disclosure.

EXAMPLE 1

As illustrated in FIG. 2, a vanadium redox flow battery (VRFB), configured to include two catholyte tanks connected to each other and two anolyte tanks connected to each other, with partition plates provided in the tanks, was prepared.

COMPARATIVE EXAMPLE 1

A vanadium redox flow battery, configured to include a catholyte tank and an anolyte tank, without any partition plate, was prepared.

TEST EXAMPLE 1

Figure 6:
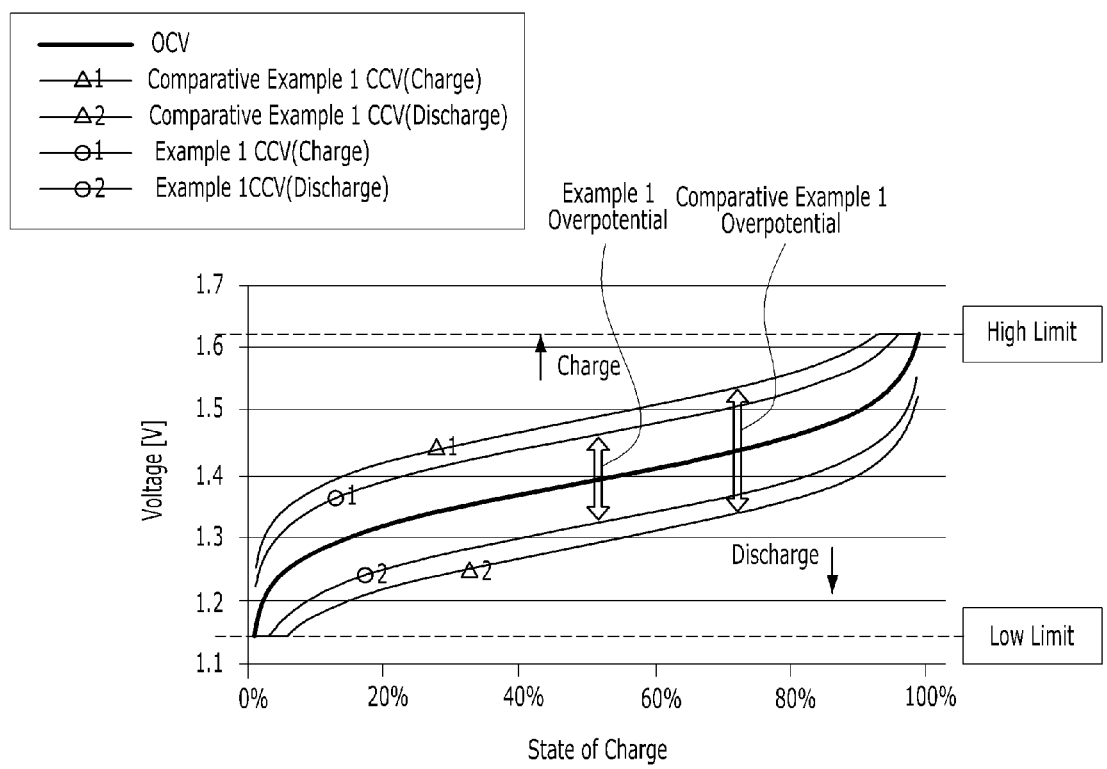
FIG. 6 is a graph showing the results of comparison of voltage and state of charge (SOC) of a conventional vanadium redox flow battery having no partition plate and a vanadium redox flow battery having a partition plate (Example 1) according to an embodiment of the present disclosure.
Figure 7:
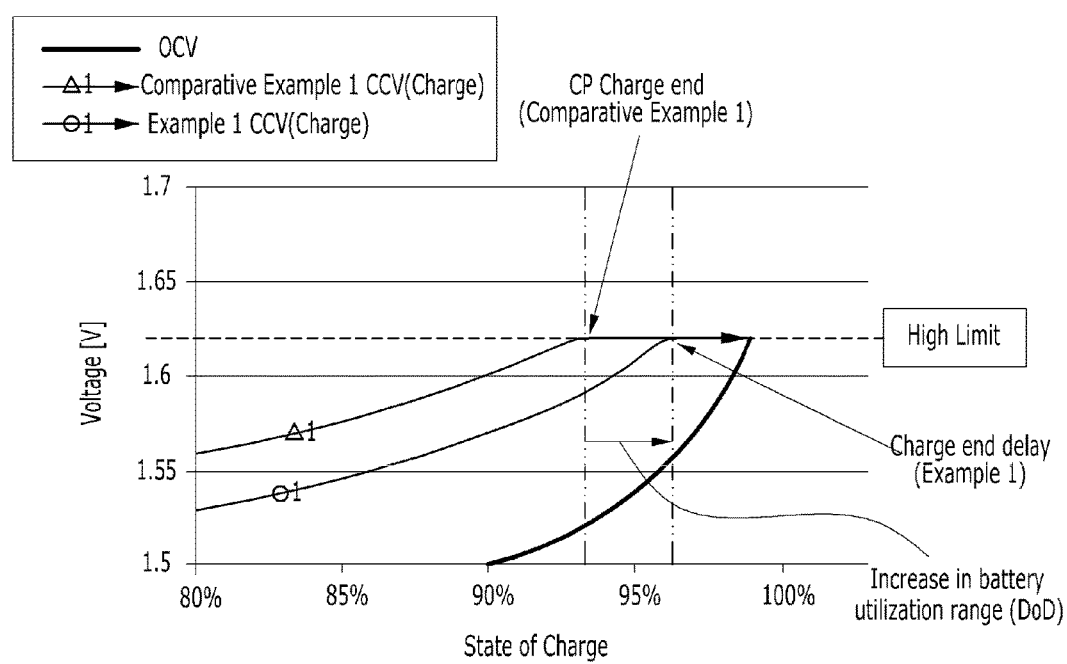
FIG. 7 is an enlarged graph of the charge end point of FIG. 6.
Figure 8:
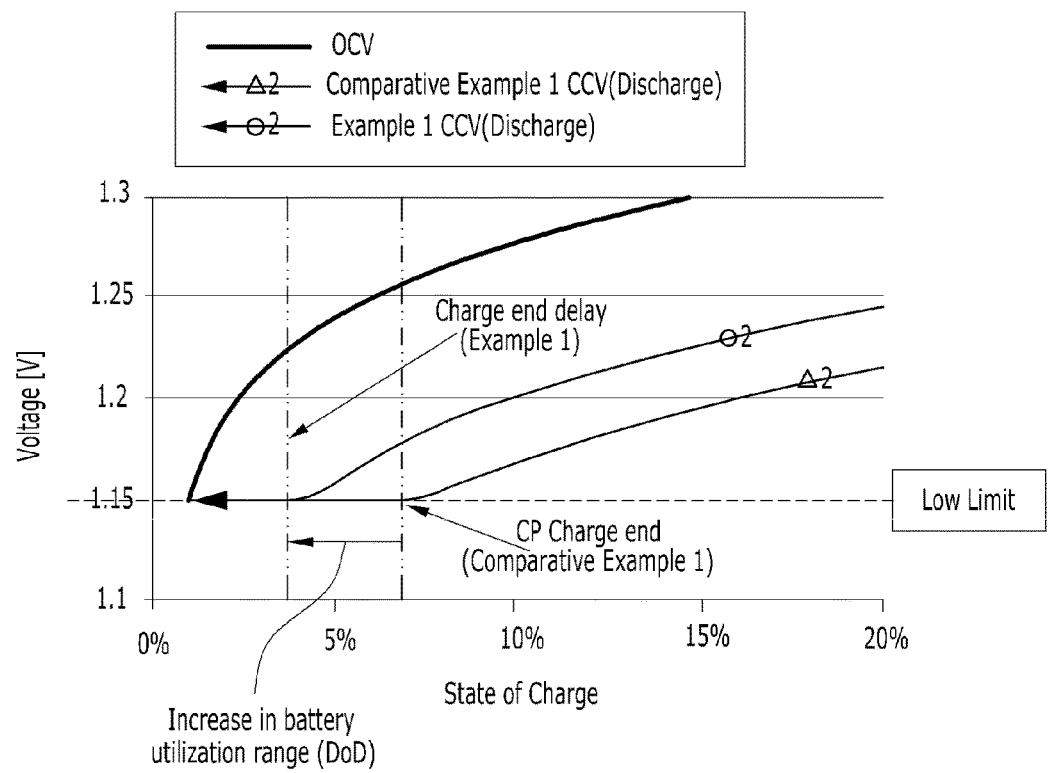
FIG. 8 is an enlarged graph of the discharge end point of FIG. 6.

In Example 1, having the electrolyte concentration gradient, and Comparative Example 1, having no electrolyte concentration gradient, charging and discharging were carried out and thus voltage and SoC (state of charge) were measured and overpotential was measured. The results are shown in FIG. 6. Also, the enlarged graphs of the charge end point and the discharge end point are shown in FIGS. 7 and 8. In FIGS. 6 to 8, OCV (Open Circuit Voltage) represents the battery voltage in the absence of a load and CCV (Closed Circuit Voltage) represents the battery voltage in the presence of a load.

The redox flow battery is configured such that the high limit or low limit of voltage is set in order to prevent overcharge or overdischarge, and when the voltage reaches the limit, the current decreases and thus charging or discharging is terminated. In Example 1, overpotential was decreased compared to Comparative Example 1, thus increasing the DoD (Depth of Discharge, battery utilization range). Specifically, the DoD was 86% (7 to 93%) in Comparative Example 1 but was increased to 92% (4 to 96%) in Example 1.

Moreover, as overpotential decreases, the voltage during charging decreases and the voltage during discharging increases, and accordingly, the voltage efficiency (discharge voltage/charge voltage) of the battery and also the energy efficiency (voltage efficiency * Coulomb efficiency) of the battery are raised. Assuming that the voltage efficiency was 88% and the Coulomb efficiency was 95% in Comparative Example 1, the energy efficiency of the battery was 83%, whereas the overpotential was reduced by 30% and thus the voltage efficiency was increased to 91%, and thus the energy efficiency was increased to 86% in Example 1.

EXAMPLES 2 TO 5

As illustrated in FIG. 9, a vanadium redox flow battery configured to include a catholyte tank and an anolyte tank with barrier ribs provided in a vertical direction was prepared. A vertical barrier rib was used in Example 2 (2 stages), three vertical barrier ribs were used in Example 3 (4 stages), seven vertical barrier ribs were used in Example 4 (8 stages), and fifteen vertical barrier ribs were used in Example 5 (16 stages) (the higher the number of stages, the larger the electrolyte concentration gradient).

COMPARATIVE EXAMPLE 2

A vanadium redox flow battery (1 stage, Comparative Example 2), which was the same as those of Examples 2 to 5 but had no barrier rib, was prepared.

TEST EXAMPLE 2

Figure 14:
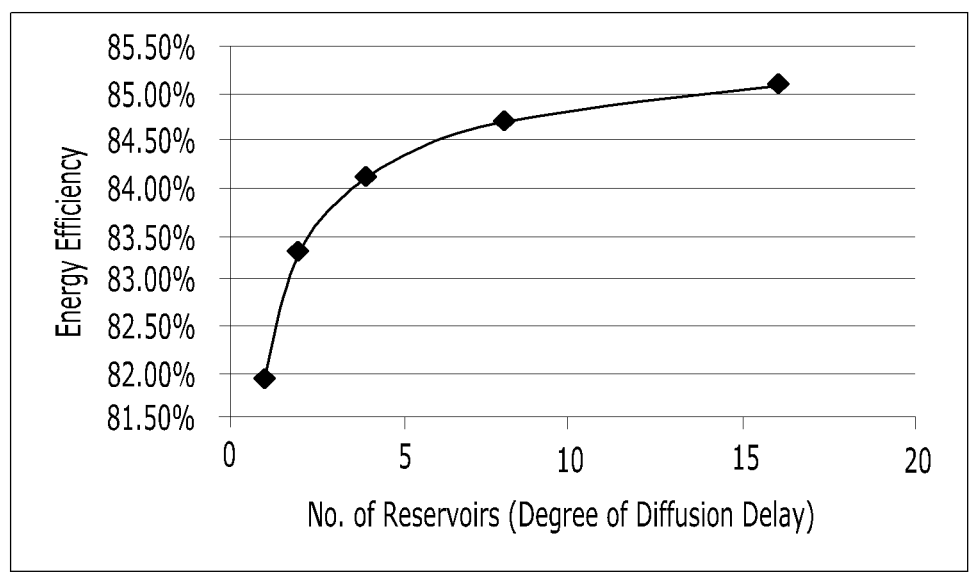
FIG. 14 is a graph showing an increase in energy efficiency depending on a reduction in overpotential of stacks of Examples 2 to 5 and Comparative Example.
Figure 15:
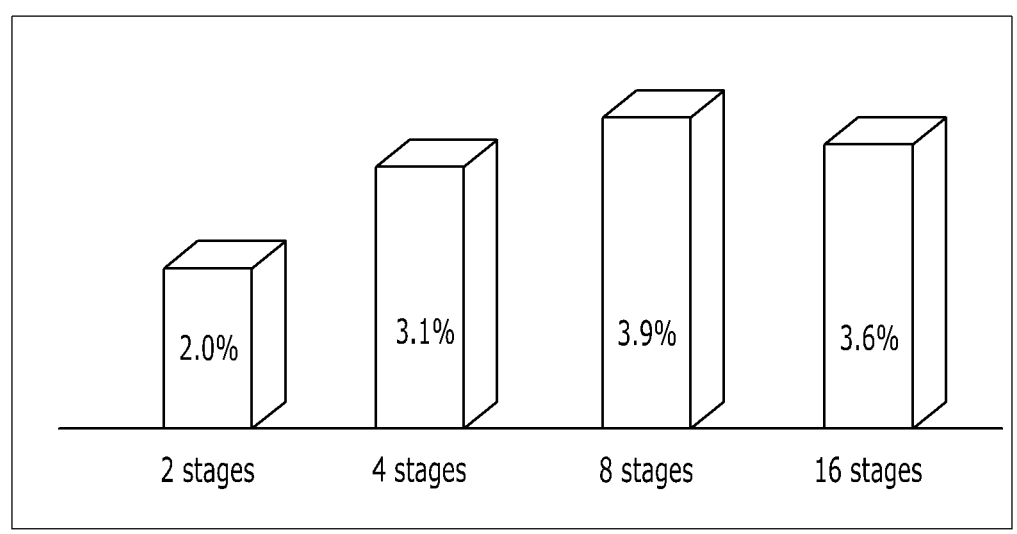
FIG. 15 is a graph showing the effects of increasing the efficiency of systems of Examples 2 to 5.

The system efficiency of Examples 2 to 5 and Comparative Example 2 was simulated and measured. The system efficiency is defined as the ratio of charged energy and discharged energy. Here, energy may be defined as [average voltage×average current×time] during charging and discharging. Particularly, when the discharge energy is calculated, the power consumption (Parasitic Loss) of BOP, such as a pump, is applied, and thus the system efficiency may be calculated using the following Equation 1. The results of Test Example 2 are shown in FIGS. 14 and 15.

$$\frac{(Avg.\ Discharge\ Voltage)*(Avg.\ Discharge\ Current)*(Discharge\ Time) - (Parasitic\ Loss)}{(Avg.\ Charge\ Voltage)*(Avg.\ Charge\ Current)*(Charge\ Time)} \quad \text{[Equation 1]}$$

Based on the simulation results, effects of i) stack overvoltage reduction and ii) pump power consumption reduction were obtained. When the stack overvoltage decreases, the current necessary for discharge is lowered, voltage efficiency, which is inversely proportional to overvoltage, increases, and DC-DC efficiency is increased therewith (FIG. 14 and Table 1 below).

TABLE 1

| No. | Voltage efficiency | Efficiency change |
|---|---|---|
| Comparative Example 2 (1 stage) | 86.23% | — |
| Example 2 (2 stages) | 87.66% | 1.44% |
| Example 3 (4 stages) | 88.53% | 2.30% |
| Example 4 (8 stages) | 89.17% | 2.95% |
| Example 5 (16 stages) | 89.58% | 3.35% |

In addition, when VRFB operates, switching to a CV mode is required or a high flow rate is necessary because the reactant concentration is lowered immediately before termination of charging/discharging (Table 2 below). By applying the present design, termination of charging/discharging may be delayed, which lowers the necessary electrolyte flow rate and decreases the pump power consumption, ultimately reducing the parasitic loss of the system, resulting in increased system efficiency.

TABLE 2

Comparison of maximally required flow rates upon termination of charging/discharging

| No. | Maximally required flow rate (L/min) |
|---|---|
| Comparative Example 2 (1 stage) | 678 |
| Example 2 (2 stages) | 563 |
| Example 3 (4 stages) | 514 |
| Example 4 (8 stages) | 487 |
| Example 5 (16 stages) | 607 |

As is apparent from FIG. 15, if the degree of cascading becomes too high, the electrolyte flow passage becomes complicated and the load of the pump increases, and moreover, the electrolyte concentration at the stack outlet becomes excessively high and reaction heat accumulates, and thus there is the likelihood that vanadium will be precipitated.

Consequently, based on the simulation results, i) OCV was increased and overvoltage was decreased due to the introduction of high-concentration feed, ii) the amount of current that was applied was decreased at the same power output, iii) the heat generated from the battery was decreased due to a reduction in overvoltage, and iv) the pump power consumption was decreased due to a reduction in electrolyte supply standard, from which the system efficiency can be confirmed to be improved by up to 4% compared to a typical VRFB such as Comparative Example.

In this specification, only a few examples of various embodiments performed by the present inventors are described, but the technical idea of the present disclosure is not limited thereto, and may be variously modified by those skilled in the art.

The invention claimed is:

1. A redox flow battery, comprising:
a catholyte tank having an electrolyte inlet at a top thereof and an electrolyte outlet at a bottom thereof and having a partition plate for forming a concentration gradient of a catholyte received therein,
wherein the partition plate controls a flow path of catholyte in order to form the concentration gradient of the catholyte;
an anolyte tank having an electrolyte inlet at a top thereof and an electrolyte outlet at a bottom thereof and having a partition plate for forming a concentration gradient of an anolyte received therein,
wherein the partition plate controls a flow path of anolyte in order to form the concentration gradient of the anolyte; and
a stack for charging and discharging power by using the concentration gradient of the catholyte and the concentration gradient of the anolyte supplied from the catholyte tank and the anolyte tank.

2. The redox flow battery of claim 1, wherein the partition plate of the catholyte tank is provided in a horizontal direction.

3. The redox flow battery of claim 1, wherein the partition plate of the anolyte tank is provided in a horizontal direction.

4. The redox flow battery of claim 1, wherein the stack includes at least one battery cell, and
the battery cell comprises:
an ion exchange membrane; and
a cathode and an anode, with the ion exchange membrane positioned therebetween.

5. A redox flow battery, comprising:
a first catholyte tank having an electrolyte inlet at a top thereof and an electrolyte outlet at a bottom thereof and having a partition plate for forming a concentration gradient of a catholyte received therein;
a second catholyte tank having an electrolyte inlet at a top thereof and an electrolyte outlet at a bottom thereof and having a partition plate for forming a concentration gradient of a catholyte received therein,
wherein the partition plate of the first catholyte tank and the partition plate of the second catholyte tank control a flow path of catholyte in order to form the concentration gradient of the catholyte of the first and second catholyte tanks respectively;
a first anolyte tank having an electrolyte inlet at a top thereof and an electrolyte outlet at a bottom thereof and having a partition plate for forming a concentration gradient of an anolyte received therein;
a second anolyte tank having an electrolyte inlet at a top thereof and an electrolyte outlet at a bottom thereof and having a partition plate for forming a concentration gradient of an anolyte received therein,
wherein the partition plate of the first anolyte tank and the partition plate of the second anolyte tank control a flow path of anolyte in order to form the concentration gradient of the anolyte of the first and second anolyte tanks respectively; and a stack for charging and discharging power by using the concentration gradient of the catholyte and the concentration gradient of the anolyte supplied from the first and second catholyte tanks and the first and second anolyte tanks.

6. The redox flow battery of claim 5, wherein the partition plate of each of the first and second catholyte tanks is provided in a horizontal direction.

7. The redox flow battery of claim 5, wherein the first catholyte tank and the second catholyte tank are connected to each other via a connection pipe through which the catholyte received therein moves.

8. The redox flow battery of claim 5, wherein the partition plate of each of the first and second anolyte tanks is provided in a horizontal direction.

9. The redox flow battery of claim 5, wherein the first anolyte tank and the second anolyte tank are connected to each other via a connection pipe through which the anolyte received therein moves.

10. The redox flow battery of claim 5, wherein the stack includes at least one battery cell, and
the battery cell comprises:
an ion exchange membrane; and
a cathode and an anode, with the ion exchange membrane positioned therebetween.

11. A redox flow battery, comprising:
a first catholyte tank having an electrolyte inlet at a top thereof and an electrolyte outlet at a bottom thereof and having a barrier rib provided in a vertical direction to form a concentration gradient of a catholyte received therein,
wherein the barrier rib controls a flow path of catholyte in order to form the concentration gradient of the catholyte;
a first anolyte tank having an electrolyte inlet at a top thereof and an electrolyte outlet at a bottom thereof and having a barrier rib provided in a vertical direction to form a concentration gradient of an anolyte received therein,
wherein the barrier rib controls a flow path of anolyte in order to form the concentration gradient of the anolyte; and
a stack for charging and discharging power by using the concentration gradient of the catholyte and the concentration gradient of the anolyte supplied from the catholyte tank and the anolyte tank.

12. The redox flow battery of claim 11, wherein a plurality of barrier ribs is provided in the catholyte tank.

13. The redox flow battery of claim 11, wherein a plurality of barrier ribs is provided in the anolyte tank.

14. The redox flow battery of claim 11, wherein the stack includes at least one battery cell, and
the battery cell comprises:
an ion exchange membrane; and
a cathode and an anode, with the ion exchange membrane positioned therebetween.

15. The redox flow battery of claim 11, wherein the redox flow battery further comprises:
a second catholyte tank having an electrolyte inlet at a top thereof and an electrolyte outlet at a bottom thereof and having a barrier rib provided in a vertical direction to form a concentration gradient of a catholyte received therein,
wherein the barrier rib of the first catholyte tank and the barrier rib of the second catholyte tank control a flow path of catholyte in order to form the concentration gradient of the catholyte of the first and second catholyte tanks respectively;
a second anolyte tank having an electrolyte inlet at a top thereof and an electrolyte outlet at a bottom thereof and having a barrier rib provided in a vertical direction to form a concentration gradient of an anolyte received therein,
wherein the barrier rib of the first anolyte tank and the barrier rib of the second anolyte tank control a flow path of anolyte in order to form the concentration gradient of the anolyte of the first and second anolyte tanks respectively; and
the stack for charging and discharging power by using the concentration gradient of the catholyte and the concentration gradient of the anolyte supplied from the first and second catholyte tanks and the first and second anolyte tanks.

16. The redox flow battery of claim 15, wherein a plurality of barrier ribs is provided in each of the first and second catholyte tanks.

17. The redox flow battery of claim 15, wherein the first catholyte tank and the second catholyte tank are connected to each other via a connection pipe through which the catholyte received therein moves.

18. The redox flow battery of claim 15, wherein a plurality of barrier ribs is provided in each of the first and second anolyte tanks.

19. The redox flow battery of claim 15, wherein the first anolyte tank and the second anolyte tank are connected to each other via a connection pipe through which the anolyte received therein moves.

20. The redox flow battery of claim 15, wherein the stack includes at least one battery cell, and
the battery cell comprises:
an ion exchange membrane; and
a cathode and an anode, with the ion exchange membrane positioned therebetween.

* * * * *